United States Patent [19]
Yu

[11] Patent Number: 5,582,470
[45] Date of Patent: Dec. 10, 1996

[54] SCANNER HOUSING

[75] Inventor: I-Ke Yu, Taipei County, Taiwan

[73] Assignee: Silitek Corporation, Taipei, Taiwan

[21] Appl. No.: 526,550

[22] Filed: Sep. 12, 1995

[51] Int. Cl.[6] .............................. H04N 5/64; A47B 81/06
[52] U.S. Cl. .................... 312/208.3; 248/918; 312/223.1
[58] Field of Search ............................ 312/223.1, 223.2, 312/237, 34.4, 208.1, 208.2, 208.3; 347/245, 263; 248/346.01, 917, 918, 919, 920, 921, 922, 923, 924; 361/679, 682, 683; 358/473, 474, 496; 348/825

[56] References Cited

U.S. PATENT DOCUMENTS

| | | | |
|---|---|---|---|
| 4,208,081 | 6/1980 | Kekas et al. | 248/917 X |
| 4,620,808 | 11/1986 | Kurtin et al. | 248/921 X |
| 5,040,074 | 8/1991 | Stemmle | 358/496 X |
| 5,294,994 | 3/1994 | Robinson et al. | 348/825 |
| 5,499,108 | 3/1966 | Cotte et al. | 358/498 X |

Primary Examiner—Peter M. Cuomo
Assistant Examiner—Hanh Tran
Attorney, Agent, or Firm—Morton J. Rosenberg; David I. Klein

[57] ABSTRACT

A scanner housing including a bottom shell, which holds a scanner base, a scanner cover shell covered on the bottom shell over the scanner base, a dust cover covered on the scanner cover shell and defining with it an upper gap, which serves as the output port of the scanner base, and a lower gap, which serves as the input port of the scanner base, and a monitor support integrally extended from the scanner cover shell at the back for supporting a monitor.

1 Claim, 4 Drawing Sheets

SCANNER HOUSING

BACKGROUND OF THE INVENTION

The present invention relates to a scanner housing for holding a scanner base which has an integral monitor support for supporting a monitor.

Various office automation equipment have been developed, and intensively used in offices to facilitate handling of a variety of jobs. However, when several office automation equipment are used, much table space is needed. In order not to occupy much table space, office automation equipment are commonly made compact in size. However, if an office automation equipment is made too small, it becomes difficult to operate. Therefore, reducing the size of the office automation equipment is not the only effective way to save table space.

SUMMARY OF THE INVENTION

The present invention has been accomplished under the circumstances in view. It is one object of the present invention to provide a scanner housing which has an integral monitor support for supporting a monitor. It is another object of the present invention to provide a scanner housing which greatly saves table space. It is still another object of the present invention to provide a scanner housing which consists of less number of parts.

According to the present invention, the scanner housing comprises a flat bottom shell for holding a scanner base; a scanner cover shell covered on the flat bottom shell over the scanner base in the flat bottom shell, the scanner cover shell having a longitudinal front opening; a monitor support extended from the scanner cover shell at a back side for supporting a monitor, the monitor support having a coupling portion for securing the monitor; and a dust cover shaped like a half-round tube covered on the longitudinal front opening of the scanner cover shell, defining with the scanner cover shell an upper gap, which serves as the output port of the scanner base in the bottom shell, and a lower gap, which serves as the input port of the scanner base in the bottom shell.

DETAILED DESCRIPTION OF THE PREFERRED EMBODIMENT

Figure 1:
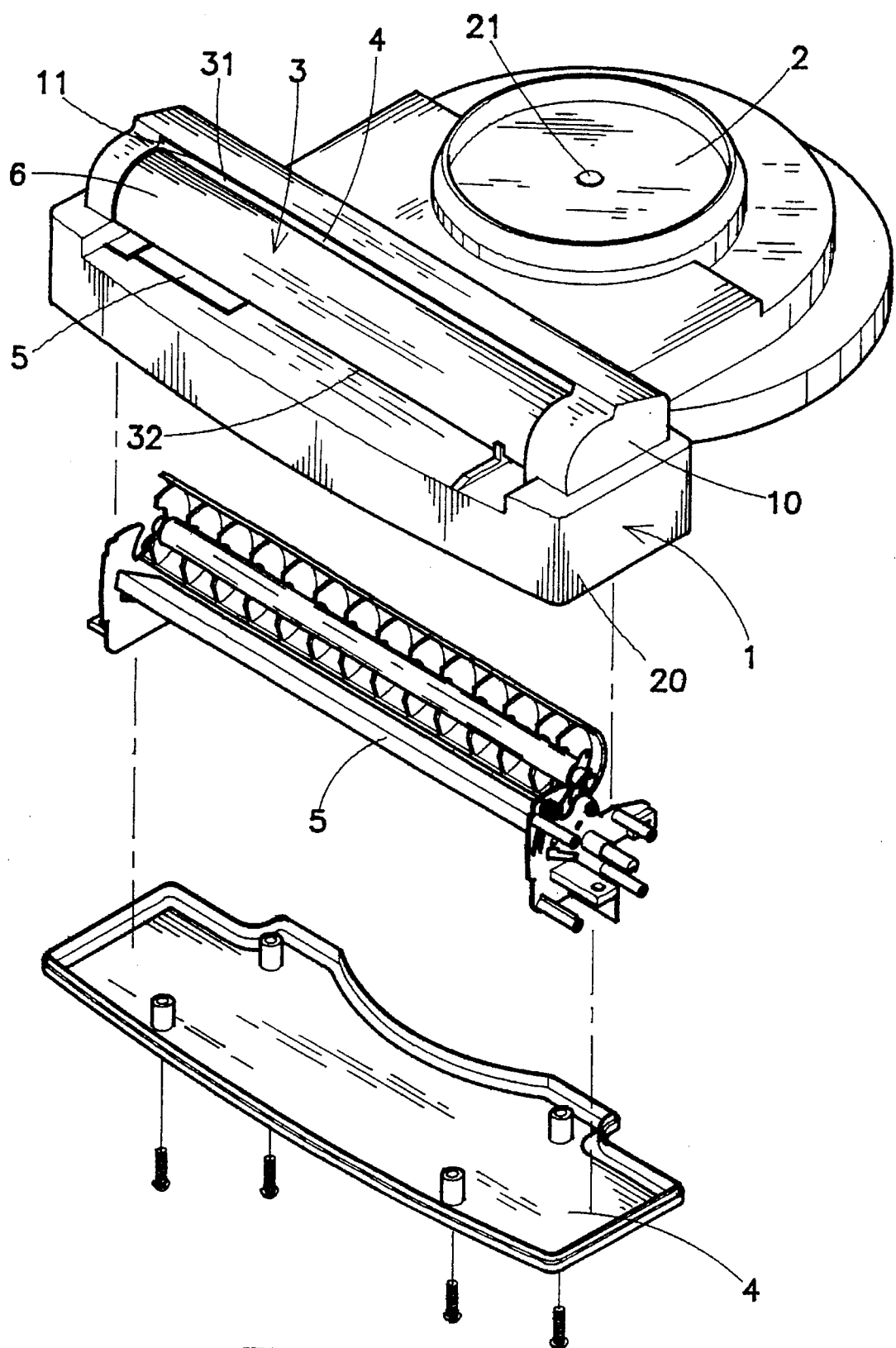
FIG. 1 is an exploded view of a scanner housing according to the preferred embodiment of the present invention.
Figure 2:
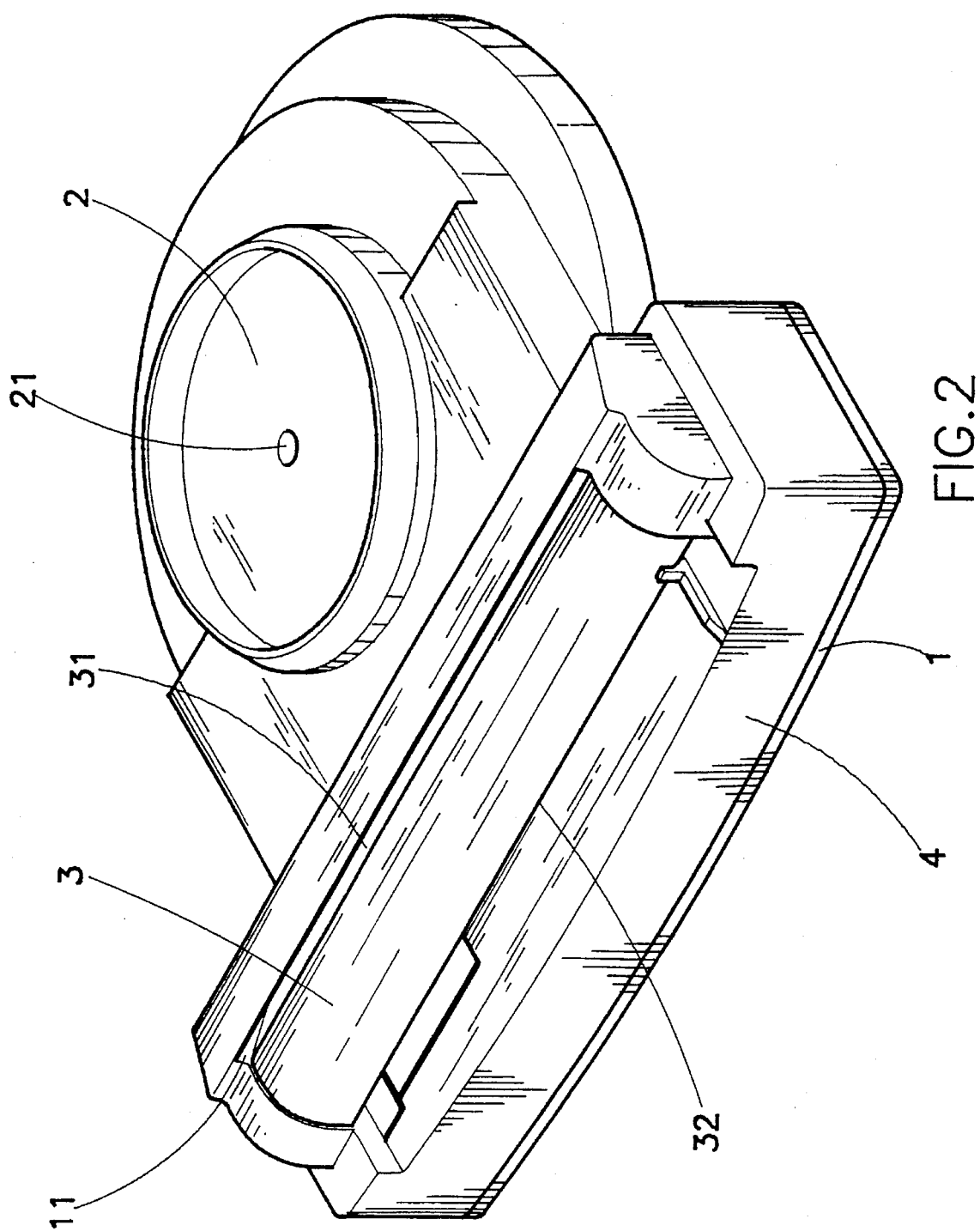
FIG. 2 is a perspective view of the scanner housing shown in FIG. 1.
Figure 3:
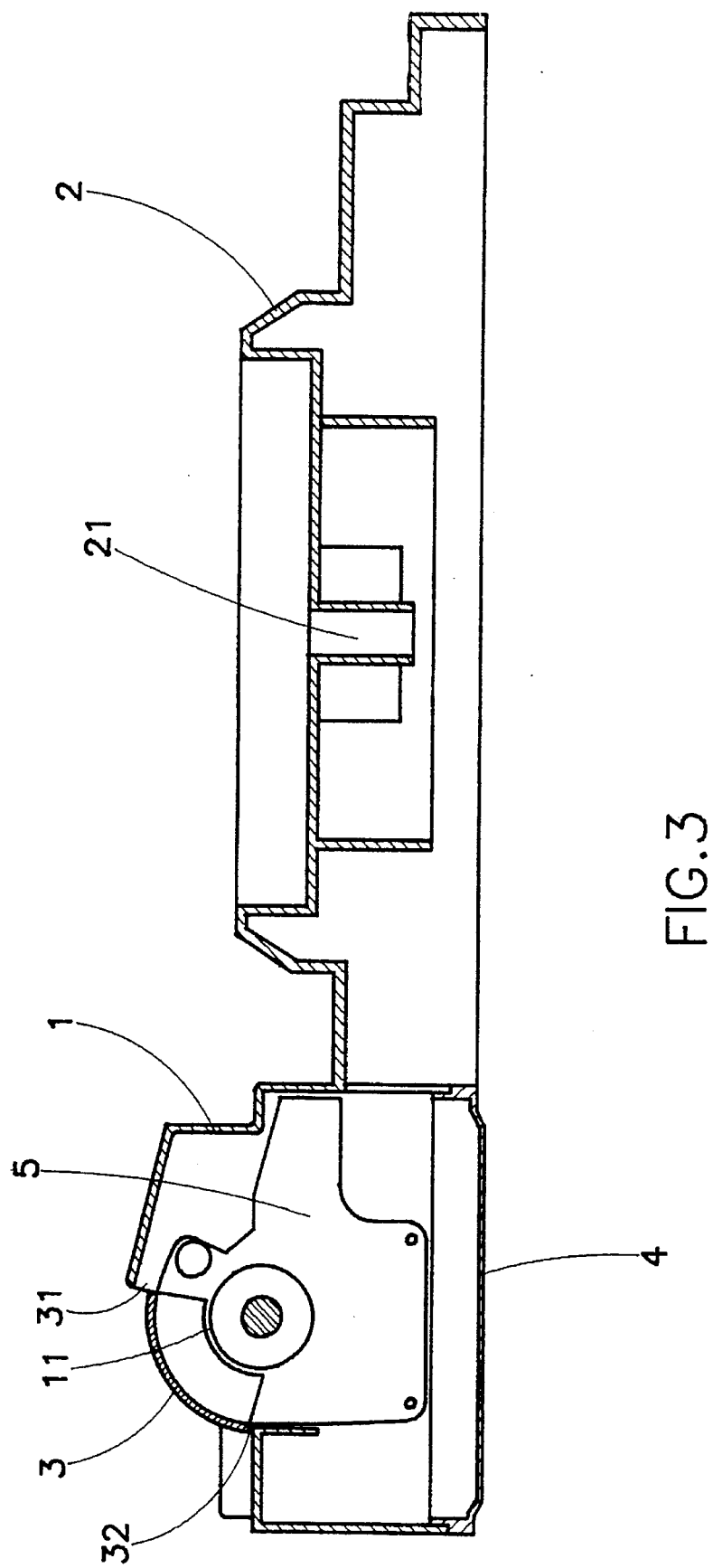
FIG. 3 is a cross-sectional view in section of FIG. 2.

Referring to FIGS. 1, 2, 3, and 4, the scanner housing in accordance with the present invention is generally comprised of a bottom shell 4 for holding a scanner base 5, a scanner cover shell 1 covered on the bottom shell 4 over the scanner base 5, a dust cover 3 covered on the scanner cover shell 1, and a monitor support 2 extended from the scanner cover shell 1 at a back side. The scanner cover shell 1 has a longitudinal front opening 11 an upper portion 10 and a sidewall portion 20. The monitor support 2 has a coupling portion 21 (for example, a plug hole, screw hole, coupling seat, etc.) for the connection of a monitor 6 or other apparatus. The dust cover 3, having substantially parallel upper and lower edges 4 and 5 and an arcuate cross sectional contour 6 therebetween, is covered on the longitudinal front opening 11 of the scanner cover shell 1, defining with the scanner cover shell 1 an upper gap 31 and a lower gap 32. The upper gap 31 serves as the output port of the scanner base 5. The lower gap 32 serves as the input port of the scanner base 5. The bottom shell 4 is a flat shell fitting over the bottom side of the scanner cover shell 1.

The aforesaid scanner cover shell 1 and monitor support 2 are integrally molded from plastics. Therefore, the scanner housing simply consists of three parts, namely, the bottom shell 4, the dust cover 3, and the scanner cover shell 1 with the monitor support 2.

Figure 4:
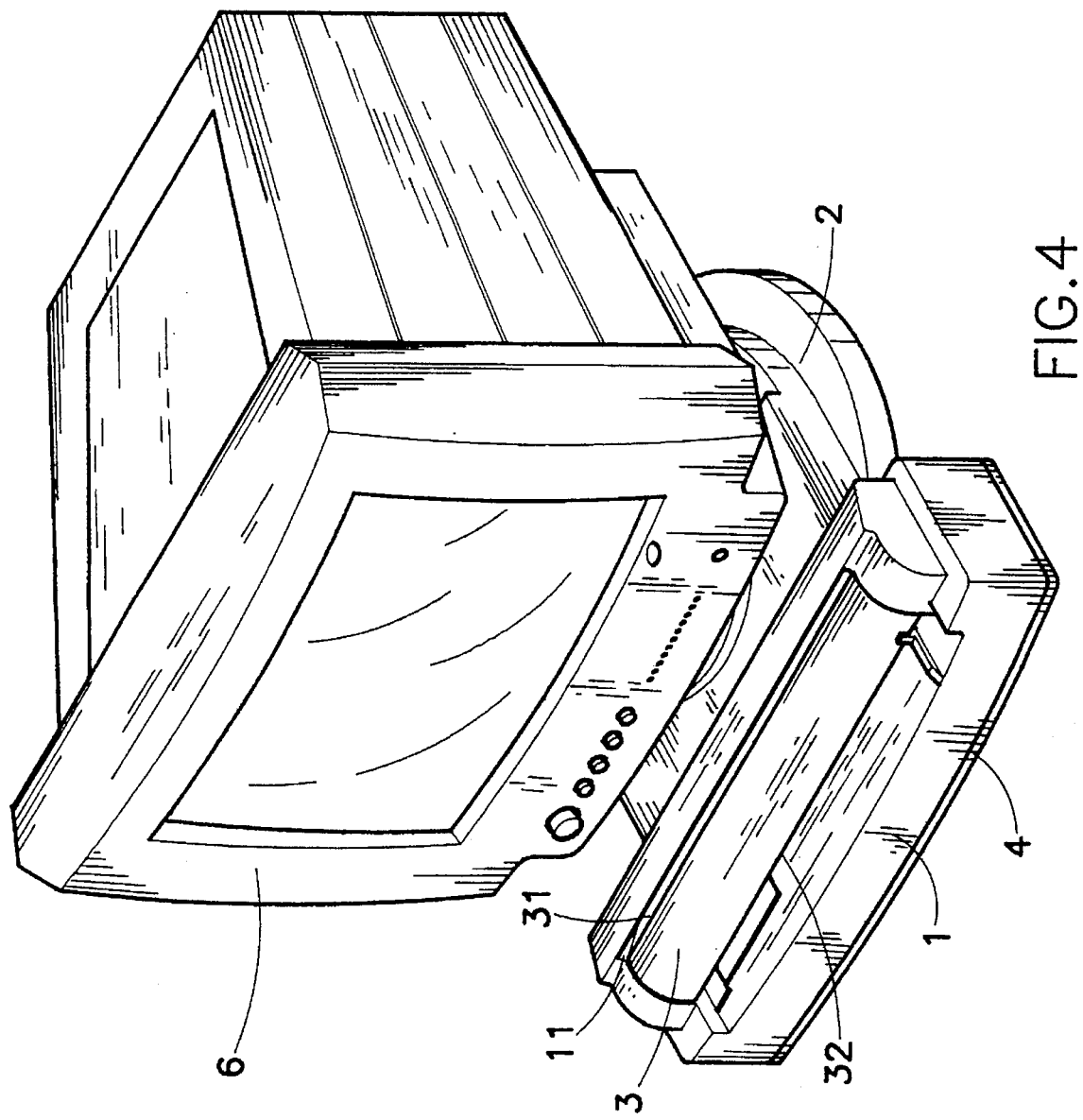
FIG. 4 is a perspective view of the present invention in typical use, showing a monitor supported on the monitor support.

Referring to FIG. 4, when the scanner housing is put on the desk, a monitor 6 can be supported on the monitor support 2 and electrically connected to the scanner base 5 inside the scanner cover shell 1.

It is to be understood that the drawings are designed for purposes of illustration only, and are not intended as a definition of the limits and scope of the invention disclosed.

I claim:

1. A scanner housing assembly for housing a scanner base and supporting a display monitor comprising:

(a) a bottom scanner shell member adapted for supporting said scanner base thereon;

(b) a top scanner shell member secured to said bottom scanner shell member, said top scanner shell member having an upper portion and a sidewall portion extending therefrom along an upright direction to define an inner chamber adapted to receive therein at least a portion of said scanner base supported on said bottom scanner shell member, said upper portion having formed therein a longitudinal opening in open communication with said inner chamber and extending in a longitudinal direction, said longitudinal direction being substantially normal to said upright direction;

(c) a monitor support extending from said sidewall portion of said top scanner shell member along a plane substantially normal to said upright direction for supporting said display monitor, said monitor support having a coupling portion adapted for releasable engagement by said display monitor; and, (d) a longitudinally extended dust cover member coupled to said upper portion of said top scanner shell member, said dust cover member having substantially parallel upper and lower edges and an arcuate cross sectional contour therebetween, said dust cover member being adapted to cover an intermediate portion of said longitudinal opening to thereby define respectively adjacent said upper and lower edges an upper gap and a lower gap, said upper and lower gaps extending substantially in said longitudinal direction and being adapted to provide operational access to said scanner base supported on said bottom scanner shell member.

* * * * *